United States Patent
Alam et al.

(10) Patent No.: US 8,055,725 B2
(45) Date of Patent: Nov. 8, 2011

(54) METHOD, APPARATUS AND PROGRAM PRODUCT FOR REMOTELY RESTORING A NON-RESPONSIVE COMPUTING SYSTEM

(75) Inventors: Akm K. Alam, Erie, CO (US); Vyacheslav Barsuk, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 11/331,699

(22) Filed: Jan. 12, 2006

(65) Prior Publication Data

US 2007/0162558 A1   Jul. 12, 2007

(51) Int. Cl.
G06F 15/16   (2006.01)
G06F 9/46   (2006.01)

(52) U.S. Cl. .................. 709/217; 718/100; 718/104

(58) Field of Classification Search ............. 709/217, 709/203, 224, 201, 227, 213; 707/103; 370/468; 714/3; 718/100, 104
See application file for complete search history.

(56) References Cited

U.S. PATENT DOCUMENTS

| | | | |
|---|---|---|---|
| 4,949,248 A * | 8/1990 | Caro ..................... | 709/203 |
| 5,909,547 A | 6/1999 | Mitra | |
| 6,138,150 A | 10/2000 | Nichols et al. | |
| 6,163,849 A | 12/2000 | Nouri et al. | |
| 6,182,089 B1 | 1/2001 | Ganapathy et al. | |
| 6,202,160 B1 | 3/2001 | Sheikh et al. | |
| 6,226,725 B1 | 5/2001 | Yarborough | |
| 6,237,024 B1 * | 5/2001 | Wollrath et al. ............ | 709/203 |
| 6,301,634 B1 | 10/2001 | Gomi et al. | |
| 6,330,690 B1 | 12/2001 | Nouri et al. | |
| 6,338,112 B1 | 1/2002 | Wipfel et al. | |
| 6,480,972 B1 | 11/2002 | Cromer et al. | |
| 6,611,915 B1 | 8/2003 | Kubik et al. | |
| 6,651,190 B1 | 11/2003 | Worley et al. | |
| 6,697,033 B1 | 2/2004 | Leung et al. | |
| 6,871,286 B1 | 3/2005 | Cagle et al. | |
| 7,350,065 B2 | 3/2008 | Barsuk | |

(Continued)

FOREIGN PATENT DOCUMENTS

JP   07-030565   1/1995

(Continued)

OTHER PUBLICATIONS

International Business Machines Corporation Research Disclosure, "Remote Automated Monitoring and Troubleshooting of Server Services and Applications", Jun. 2000, n434124, p. 1108.

(Continued)

*Primary Examiner* — Joe Cheng
*Assistant Examiner* — Stephanie Chang
(74) *Attorney, Agent, or Firm* — Arthur J. Samodovitz

(57) ABSTRACT

A method for restoring a remote server that is not responding due to a memory constraint is provided. The method comprises providing a remote server connected to a network communications channel, pinning a reserve memory segment program to the memory in the remote server to control a reserve memory segment allocated within the memory in the remote server when a memory constraint arises. The method further comprises continuously running the reserve memory segment program to listen for a request packet to release the reserve memory segment that is allocated, releasing the reserve memory segment within the memory in the remote server in response to the request packet received, and performing any corrective action at the remote server for restoring the remote server when the reserve memory segment is released.

20 Claims, 5 Drawing Sheets

U.S. PATENT DOCUMENTS

| | | | |
|---|---|---|---|
| 7,421,511 B2 * | 9/2008 | Shiga et al. | 709/235 |
| 2002/0078340 A1 | 6/2002 | Baitinger et al. | |
| 2003/0037278 A1 | 2/2003 | Olarig | |
| 2004/0024957 A1 | 2/2004 | Lin et al. | |
| 2004/0133790 A1 | 7/2004 | Hensley | |
| 2004/0141461 A1 | 7/2004 | Zimmer et al. | |
| 2004/0193625 A1 | 9/2004 | Sutoh et al. | |
| 2004/0204245 A1 | 10/2004 | Amaitis et al. | |
| 2004/0267918 A1 | 12/2004 | Guarraci et al. | |
| 2004/0268078 A1 * | 12/2004 | Hassan | 711/170 |
| 2005/0034012 A1 | 2/2005 | Bartlett et al. | |
| 2005/0055495 A1 | 3/2005 | Vihmalo et al. | |
| 2005/0060529 A1 | 3/2005 | Chen | |
| 2005/0080874 A1 | 4/2005 | Fujiwara et al. | |
| 2005/0172326 A1 * | 8/2005 | Jerding et al. | 725/116 |
| 2006/0075204 A1 * | 4/2006 | Kumar | 711/173 |
| 2006/0136908 A1 * | 6/2006 | Gebhart et al. | 717/177 |

FOREIGN PATENT DOCUMENTS

| | | |
|---|---|---|
| JP | 11-282724 A | 10/1999 |
| JP | 2000-010822 A | 1/2000 |
| JP | 2000-148629 | 5/2000 |
| JP | 2003-177945 A2 | 6/2003 |
| JP | 2005-234720 A | 9/2005 |
| WO | 95/27249 A1 | 10/1995 |
| WO | 02/33552 A2 | 4/2002 |

OTHER PUBLICATIONS

International Business Machines Corporation Research Disclosure, "Automatic Restart of DCE Through Tivoli Management Environment", Dec. 1999, n 428127, p. 1694.

International Business Machines Corporation Research Disclosure, Method for Automatically Configuring Static Network Addresses in a Server Blade Environment, Oct. 2001, n450133, p. 1776.

Non-Final Office Action dated May 8, 2006 for U.S. Appl. No. 10/736,429.

Final Office Action dated Sep. 20, 2006 for U.S. Appl. No. 10/736,429.

Non-Final Office Action dated Jul. 9, 2007 for U.S. Appl. No. 10/736,429.

Notice of Allowance dated Nov. 5, 2007 for U.S. Appl. No. 10/736,429.

* cited by examiner

METHOD, APPARATUS AND PROGRAM PRODUCT FOR REMOTELY RESTORING A NON-RESPONSIVE COMPUTING SYSTEM

FIELD OF THE INVENTION

The present invention relates to an apparatus, method and program product for remotely restoring a non-responsive computing system. More particularly, the present invention relates to an apparatus, method and program product for remotely restoring a non-responsive computing system that is experiencing memory constraints without having to perform a power reset or having to reboot the computing system.

BACKGROUND OF THE INVENTION

In today's business environment, organizations and/or businesses utilize a wide variety of distributed computing systems to communicate between application programs hosted on numerous workstations and/or servers. Further, recent trends have seen a steady increase in the number of servers used in businesses and/or organizations. Accordingly, many distributed computing systems employ additional types of servers that carryout specific functions and which servers are positioned at different locations within a business and/or organization, rather than at one central location. While data placed on these servers is considered critical to the business, there remains insufficient means for ensuring the proper operation of these servers from a single service site when these servers are spread out in different locations. Accordingly, there is a need to simplify the process of maintaining proper operation of such servers, while at the same time controlling any costs associated with such maintenance

SUMMARY OF THE INVENTION

In another aspect of the invention, there is provided a method for restoring a remote server that is not responding due to a memory constraint. The method comprises providing a remote server connected to a network communications channel, pinning a reserve memory segment program to the memory in the remote server to control a reserve memory segment allocated within a memory in the remote server when a memory constraint arises. Preferably, the pinning step includes allocating the reserve memory segment within the memory in the remote server. The method further comprises continuously running the reserve memory segment program to listen for a request packet to release the reserve memory segment that is allocated, releasing the reserve memory segment within the memory in the remote server in response to the request packet received, and performing any corrective action at the remote server for restoring the remote server when the reserve memory segment is released. Preferably, the continuously running step comprises listening to a predetermined TCP/IP port over the network communications channel for the request packet, and receiving the request packet over the network communications channel. Preferably, the releasing step comprises validating the request packet received, identifying the request packet received, and checking whether the request packet received corresponds to an operation that is permissible on the remote server. In a preferred embodiment, the performing step further comprises periodically checking the memory on the remote server for detecting the memory constraint, and sending the request packet to release the reserve memory segment when the memory constraint is detected. Further, preferably, the performing step comprises running an auto-recovery program on the remote server to perform the any corrective action at the remote server when the reserve memory segment is released.

In one aspect of the invention, there is provided an apparatus for restoring a remote computing system that is not responding due to a memory constraint. The apparatus comprises a network communications channel, a remote computing system connected to the network communications channel, the remote computing system having allocated within a memory a reserve memory segment, a reserve memory segment program pinned to the memory of the remote computing system and running continuously on the remote computing system, the reserve memory segment program being configured to control the reserve memory segment that is allocated within the memory of the remote computing system, and a control computing system connected to the network communications channel and configured to send a request over the network communications channel to the remote computing system to release the reserve memory segment memory using the reserve memory segment program when a memory constraint arises, such that the control server is able to administer one or more corrective actions to restore the remote computing system. In a preferred embodiment, the request comprises a TCP/IP packet. Preferably, the reserve memory segment program is further configured to listen to a predetermined TCP/IP port for the request over the network communications channel and is further configured to receive the request over the network communications channel. Further, preferably, the reserve memory segment program is configured to validate the TCP/IP packet received and to identify the TCP/IP packet received. Moreover, preferably the reserve memory segment program is further configured to check whether the TCP/IP packet corresponds to an operation that is permissible on the remote computing system. Preferably, the control computing system is further configured to send the request based on a determination that the remote computing system is not responding due to the memory constraint and to send the request comprising the TCP/IP packet to release the reserve memory segment to the remote computing system. In a preferred embodiment, the apparatus further comprises an auto-recovery program running on the remote computing system and being configured to periodically check the memory on the remote computing system for detecting the memory constraint and to request that the reserve memory segment program be released when the memory constraint is detected. Preferably, the auto-recovery program is further configured to perform one or more corrective actions at the remote computing system upon release of the reserve memory segment.

In another aspect of the invention, there is provided a computer program product for restoring a remote server that is not responding due to a memory constraint. The computer program product comprises a computer readable medium, first program instructions to allocate a reserve memory segment of a memory residing on a remote server, second program instructions to pin a reserve memory segment program to the memory residing on the remote server, third program instructions to continuously run the reserve memory segment program pinned to listen for a request packet when a memory constraint arises, fourth program instructions to release the reserve memory segment in response to the request packet that is received when the memory constraint arises on the remote server. The computer program product further comprises fifth program instructions to periodically check the memory residing on the remote server for the memory constraint and, if the memory constraint is found, to send the request packet to the remote server. Preferably, each of the first, second, third, fourth and fifth program instructions are stored on the medium. In a preferred embodiment, the third program instructions further comprise instructions to listen to a predetermined TCP/IP port for the request packet and to receive the request packet comprising a TCP/IP packet for releasing the reserve memory segment. Preferably, the fourth program instructions further comprise instructions to validate the request TCP/IP packet received and to identify the TCP/IP packet received. Further, preferably, the fourth program instructions further comprise instructions to check whether the request TCP/IP packet received corresponds to an operation that is permissible on the remote server. Preferably, the fifth program instructions further comprise instructions to perform a corrective action at the remote server upon release of the reserve memory segment.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
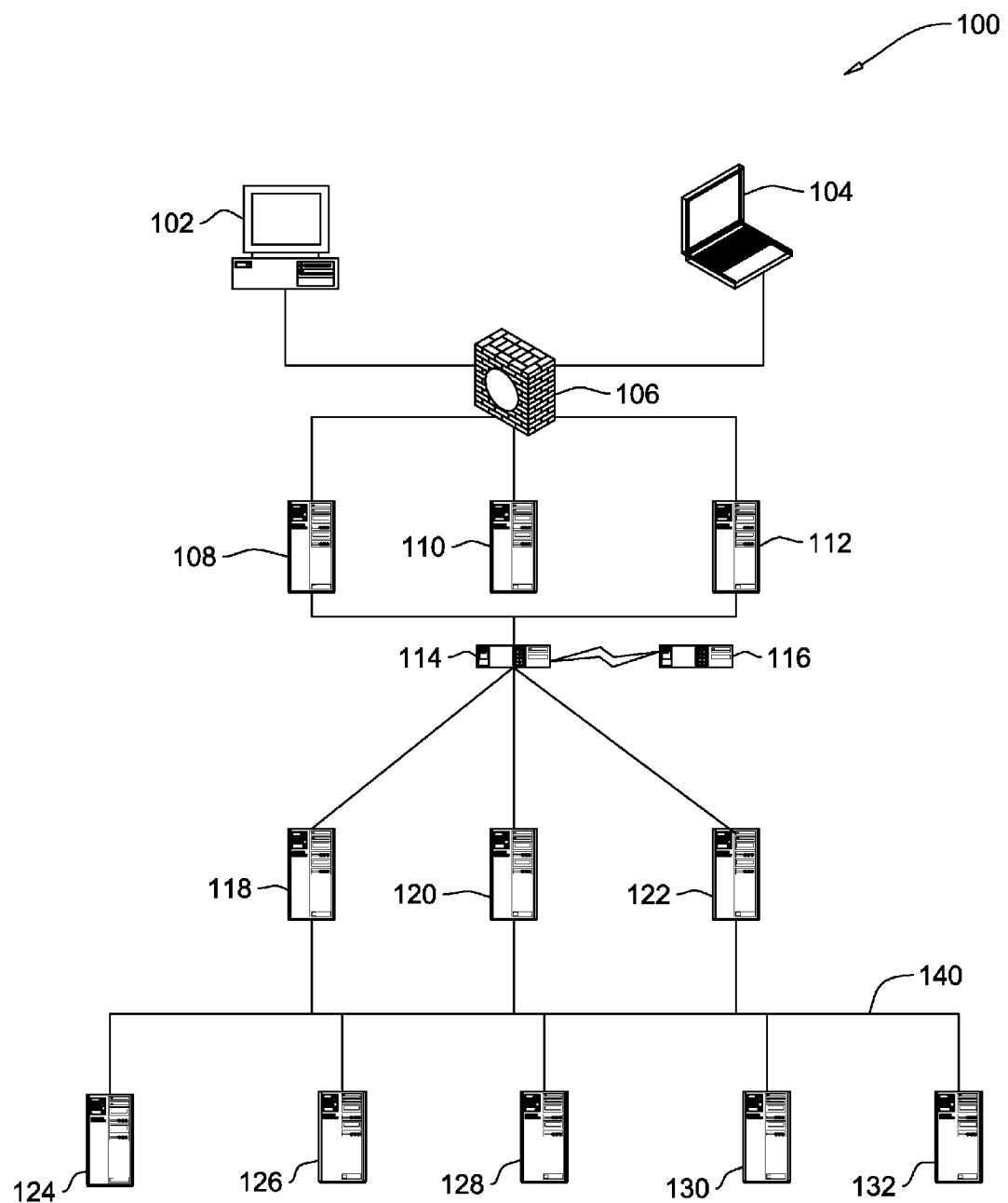
FIG. 1 illustrates a network configuration of an apparatus for remotely restoring a non-responsive computing system, in accordance with an embodiment of the invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides an apparatus or system for restoring a remote computing or computer system that is not responding due to a memory constraint. The apparatus comprises a network communications channel, a remote computing system connected to the network communications channel, the remote computing system having allocated within a memory a reserve memory segment, a reserve memory segment program pinned to the memory of the remote computing system and running continuously on the remote computing system, the reserve memory segment program being configured to control the reserve memory segment that is allocated within the memory of the remote computing system, and a control computing system connected to the network communications channel and configured to send a request over the network communications channel to the remote computing system to release the reserve memory segment memory using the reserve memory segment program when a memory constraint arises, such that the control server is able to administer one or more corrective actions to restore the remote computing system. In a preferred embodiment, the request comprises a TCP/IP packet. Preferably, the reserve memory segment program is further configured to listen to a predetermined TCP/IP port for the request over the network communications channel and is further configured to receive the request over the network communications channel. Further, preferably, the reserve memory segment program is configured to validate the TCP/IP packet received and to identify the TCP/IP packet received. Moreover, preferably the reserve memory segment program is further configured to check whether the TCP/IP packet corresponds to an operation that is permissible on the remote computing system. Preferably, the control computing system is further configured to send the request based on a determination that the remote computing system is not responding due to the memory constraint and to send the request comprising the TCP/IP packet to release the reserve memory segment to the remote computing system. In a preferred embodiment, the apparatus further comprises an auto-recovery program running on the remote computing system and being configured to periodically check the memory on the remote computing system for detecting the memory constraint and to request that the reserve memory segment program be released when the memory constraint is detected. Preferably, the auto-recovery program is further configured to perform one or more corrective actions at the remote computing system upon release of the reserve memory segment.

As used herein, the term "remote computing system" or "remote computer system" or "remote server" refers to a remote computing device, preferably, a remote server that is accessed via a network connection. Further, the term "control computing system" or "control server" refers to a remote computing device, preferably, a remote control server that is configured to control processes on the remote computing system or server. Additionally, the term "reserve memory segment" refers to a piece of memory on a computing system, preferably, a remote server, where the piece of memory is allocated or reserved to the remote server. Moreover, as used herein, the term "reserve memory segment program" or "segment program" or "pinned program" refers to a small-size program or code running on the remote server, which is pinned to a memory of the remote server.

Reference is now made to FIG. 1, which illustrates one embodiment of an apparatus or system 100 for restoring a remote computer system, preferably, a remote server, which is not responding due to a memory constraint, in accordance with an embodiment of the invention. The apparatus or system 100 of FIG. 1 includes application users that use computing devices 102 and 104, preferably, individual workstations 102 and 104 that communicate with other computing systems in the system 100 via a network communications channel 140. In one embodiment, the system 100 includes computing systems, 108, 110 and 112, preferably, proxy servers, that are separated from the application users 102 and 104 and protected via a firewall with some sort of a secure application access port 106. Further, the system 100 includes computing systems, 118, 120 and 122, preferably, application servers 118, 120 and 122, which may be accessed by the application users 102 and/or 104 via the network communications channel 140. Preferably, the system includes a load balance server cluster 114 and 116 that protect the system 100 from overload. In a preferred embodiment, the load balance server cluster acts as traffic system for network request and takes user request and distributes the request to a server who is not too busy. Further, the system 100 includes other computing systems, preferably, a cluster of servers 124, 126, 128, 130 and 132 that perform a variety of functions. In one embodiment, the servers include a database server 124, a messaging server 126, an authentication server, 128, a batch server 130 and a reporting server 132. Preferably, each of the servers, 108, 110, 112, 118, 120, 122, 124, 126, 128, 130 and 132 are connected to each other and to the application users 102 and 104 via the network communications channel 140. In a preferred embodiment, any one of the servers 108, 110, 112, 118, 120, 122, 124, 126, 128, 130 and 132 can be configured as a control server. Preferably, configuration of a server as a control server is carried out by a system administrator. For instance, if the server 120 is configured as the control server, then the control server 120 which is coupled to each of the remote servers or computing systems 108, 110, 112, 118, 122, 124, 126, 128, 130 and 132 can provide remote restoration of any of the remote servers 108, 110, 112, 118, 122, 124, 126, 128, 130 and 132 through the network 140. In a preferred embodiment, such control may be directed through user input at stations 102 and/or 104. As will be described in more detail with respect to FIG. 2, the configuration of the system of FIG. 1 may be used to carry out a request from a control server to a remote server to perform some specified action, such as requesting release of a reserve memory segment at the remote server 200, by sending a message on the network 140 between the control server and the remote server, and is further explained with respect to FIG. 2.

Figure 2:
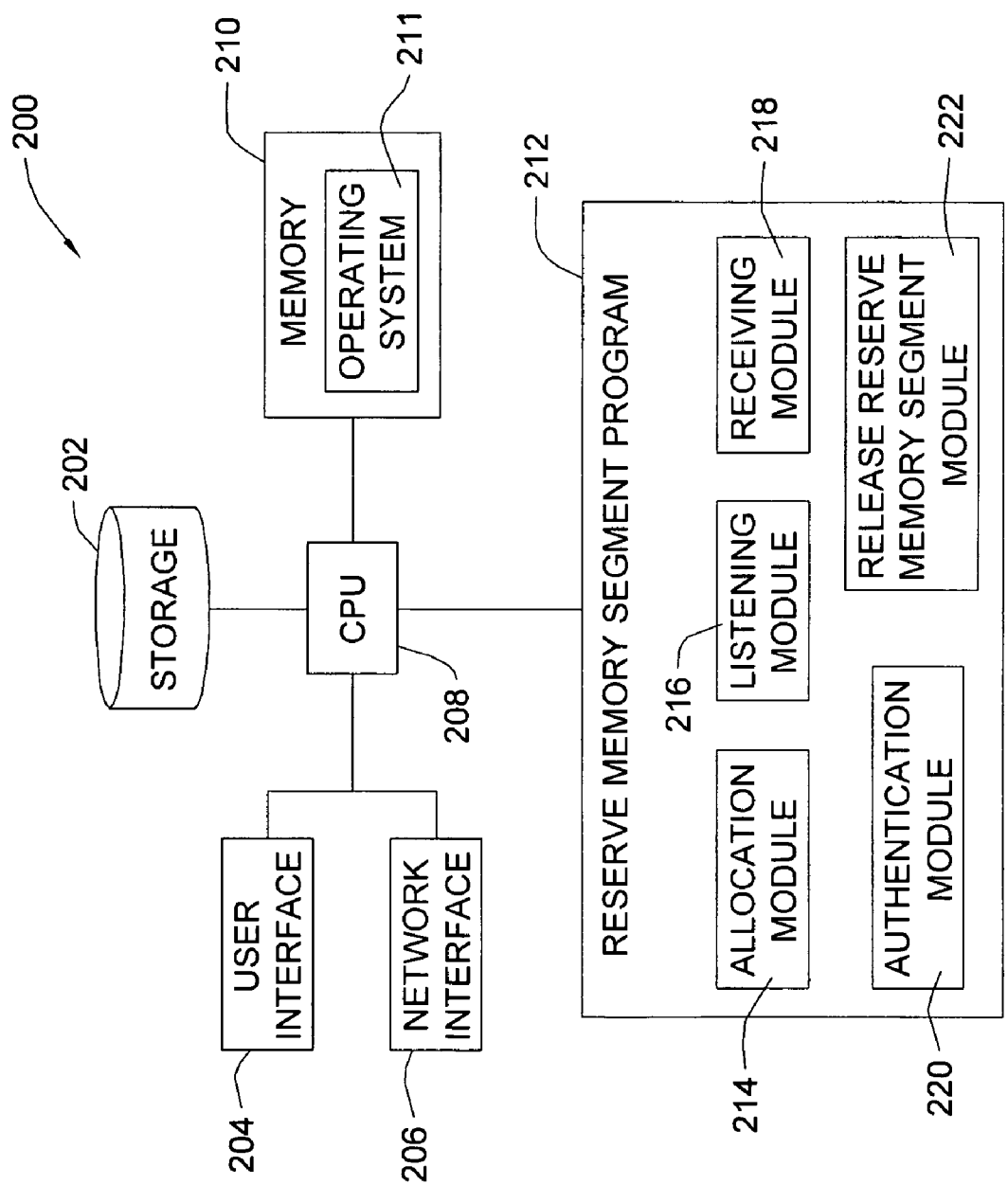
FIG. 2 is a block diagram illustrating one embodiment of a remote server that is configured for restoring the remote server, in accordance with an embodiment of the present invention.

Turning to FIG. 2, reference numeral 200 shows an embodiment of a remote server 200, for instance, an application server (118, 120 or 122) as shown in FIG. 1, which is configured to restore the remote server, for instance, when a memory constraint occurs. FIG. 2 shows an embodiment of a remote server 200. Preferably, the remote server 200 includes a central processing unit (CPU) 208, a local storage device 202, a user interface 204, a network interface 206, a memory 210 that includes an operating system 211, and a reserve memory segment program component 212. The CPU 208 is configured generally to execute operations within the remote server 200. The user interface 204, in one embodiment, is configured to allow a user to interact with the remote server 200, including allowing input data and commands from a user and communicating output data to the user. The network interface 206 is configured, in one embodiment, to facilitate network communications of the remote server 200 over the communications channel 140 of the system 100, shown in FIG. 1. The local memory 210 is configured, in one embodiment, to store the operating system 211 as well as several data and metadata files that may be used for restoring the remote server and for taking any corrective action or operation. In an alternative embodiment, some or all of these data and metadata files may be replicated in the local storage device 202. In a further embodiment, one or all of these data and metadata files may be stored exclusively in the local storage device 202 rather than in the memory 210. In another embodiment, one or all of these data and metadata files may be stored in distributed storage on the system 100.

Further, in one embodiment, the remote server preferably comprises a reserve memory segment program component 212 that comprises several modules, including an allocation module 214, a listening module 216, a receiving module 218, an authentication module 220 and a release segment module 222. The reserve memory segment program component on a remote server is provided with a logic unit containing a plurality of modules configured to functionally execute the necessary steps of releasing the reserve memory segment at the remote server in order to restore the remote server, for instance, when a memory constraint occurs. The purpose of the reserve memory segment program component 212 is to implement various methods of allocating a reserve memory segment of memory to the remote server, and of controlling the reserve memory segment that is allocated within the memory when the remote server is experiencing an out of memory condition. In a preferred embodiment, the allocation module 214 allocates a reserve memory segment of memory within the remote server to the remote server. In a preferred embodiment, the listening module 216 listens and waits for a packet on a predetermined port requesting release of the reserve memory segment. In a preferred embodiment, the receiving module 218 receives a packet on a predetermined port requesting release of the reserve memory segment. In a preferred embodiment, the authentication module 220 validates the packet received and identifies the type of request made in the packet received. In a preferred embodiment, the release reserve memory segment module 222 releases the reserve memory segment when a packet with a request has been authenticated.

The functional units of the reserve memory segment program 212 described herein above have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data.

When a remote server 200 runs out of memory 210, preferably, the operating system 211 starts to halt programs/processes running on the remote server 200 that require additional memory, and the larger programs tend to be terminated first. If program/process running on the remote server 200 is not pinned to memory 210 (normally it is not), the program/process competes for memory 210 with other programs. If the program/process is pinned to memory 210, the program/process has its own memory allocated for it and no other program/process can use it. To ensure that the remote server 200 continues to be able to be accessed by a user 102 or 104, the reserve memory segment program 212 is provided at the remote server 200. The reserve memory segment program 212 is a small program running on the remote server 200 and is pinned to memory 210. The reserve memory segment program 212, preferably, requires very little memory 210, and in a preferred embodiment, the reserve memory segment program 212 uses only between 10 MB and 100 MB of memory 210, such that, there is enough memory 210 available for a system administrator to remotely login to the remote server, if the remote server is hung or frozen. However, the size of the reserve memory segment program 212 can vary depending on the actual memory available on the remote server, and, preferably, should be a configurable size that is sufficient for carrying out a restoration action. However, as indicated, the present invention is not meant to be limited to a particular size. In a preferred embodiment, the reserve memory segment program 212 responds to calls, such as a request, preferably, a TCP/IP request, as described herein below.

In another embodiment, the present invention provides a method for restoring a remote server that is not responding due to a memory constraint. The method comprises providing a remote server connected to a network communications channel, pinning a reserve memory segment program to the memory in the remote server to control a reserve memory segment allocated within a memory in the remote server when a memory constraint arises. Preferably, the pinning step includes allocating the reserve memory segment within the memory in the remote server. The method further comprises continuously running the reserve memory segment program to listen for a request packet to release the reserve memory segment that is allocated, releasing the reserve memory segment within the memory in the remote server in response to the request packet received, and performing any corrective action at the remote server for restoring the remote server when the reserve memory segment is released. Preferably, the continuously running step comprises listening to a predetermined TCP/IP port over the network communications channel for the request packet, and receiving the request packet over the network communications channel. Preferably, the releasing step comprises validating the request packet received, identifying the request packet received, and checking whether the request packet received corresponds to an operation that is permissible on the remote server. In a preferred embodiment, the performing step further comprises periodically checking the memory on the remote server for detecting the memory constraint, and sending the request packet to release the reserve memory segment when the memory constraint is detected. Further, preferably, the performing step comprises running an auto-recovery program on the remote server to perform the any corrective action at the remote server when the reserve memory segment is released.

Figure 3:
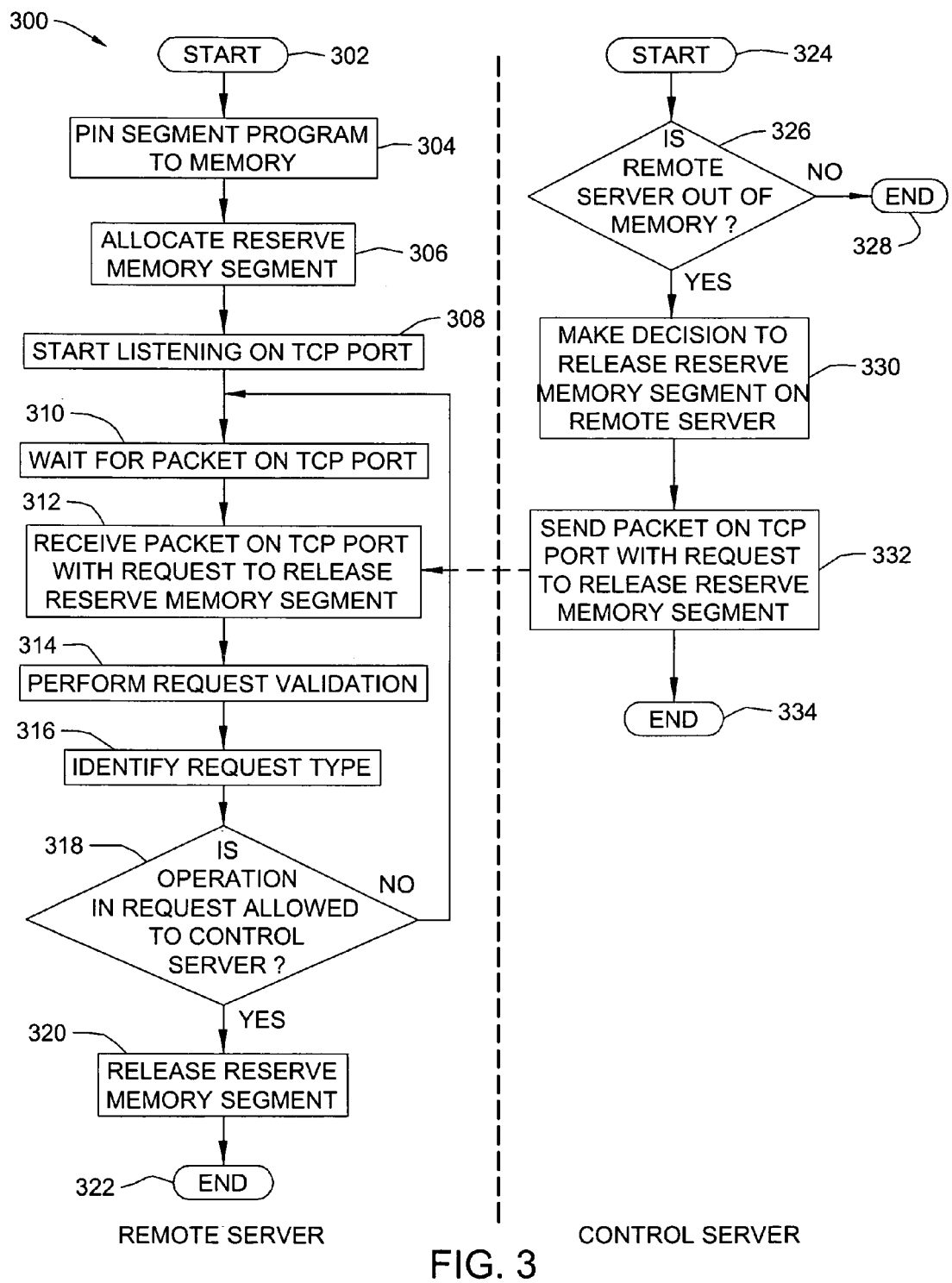
FIG. 3 is an illustration of a flowchart depicting a method for remotely restoring a non-responsive computing system, in accordance with an embodiment of the invention.
Figure 4:
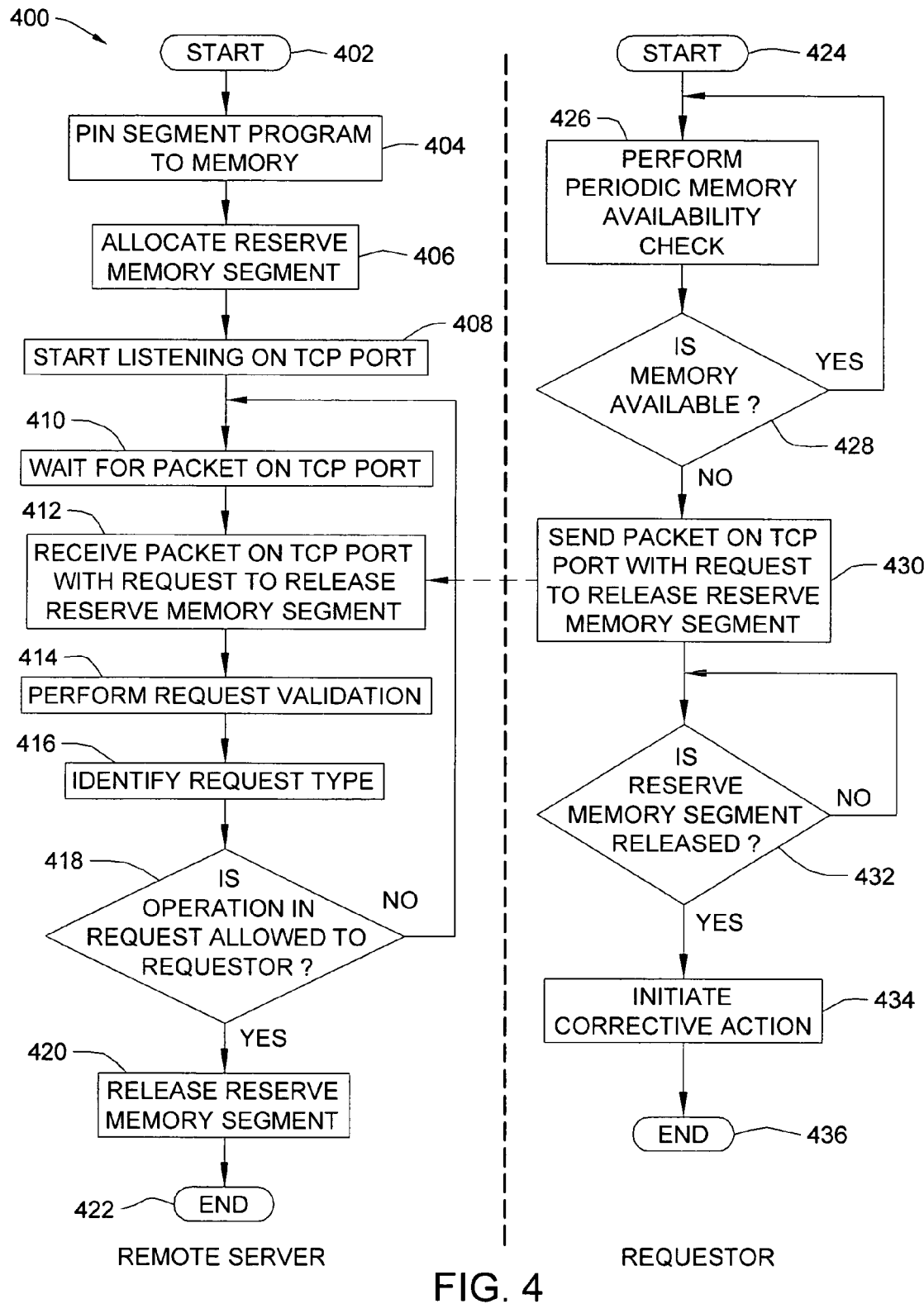
FIG. 4 is an illustration of a flowchart depicting a method for remotely restoring a non-responsive computing system, in accordance with an embodiment of the invention.

Reference is now made to FIGS. 3 and 4, which depict methods for restoring a remote computing system that is not responding due to a memory constraint. Turning to FIG. 3, the method 300 for restoring a remote computing system, preferably, a remote server, starts at step 302 with a reserve memory segment program or code (also referred to herein below as "segment program"), which is pinned to memory in step 304. Preferably, the segment program is small in size and is pinned into memory, such that, the program constantly resides in memory. Further, the segment program is marked as unmovable so that no other program can swap space with the segment program, and the segment program is given higher run priority. Moreover, the reserve memory segment is booked by the segment program and is not available for any other purpose. Preferably, when the segment program starts for the very first time, the segment program reserves or allocates a piece of memory in step 306, which piece of memory is referred to herein as a reserve memory segment. In a preferred embodiment, the reserve memory segment is quite small and uses very little memory and depending upon the implementation of the system, the reserve memory segment may, for example, typically comprise a range between 30 megabytes (MB) and 100 MB in size, such that, there is enough memory available for a system administrator to remotely login to the remote server, if the remote server is frozen. However, the size of the reserve memory segment can vary depending on the actual memory available on the remote server. Alternatively, the reserved memory segment can be created by another program besides the reserve memory segment program. For instance, the reserve memory segment can be either created in advance by another program or by the pinned segment program at its start as described in FIGS. 3 and 4. However, if the reserve memory segment was not created by the segment program, a mechanism is required in order to provide the pinned segment program control over the reserve memory segment in order to release that memory.

Once the segment program has allocated the reserve memory segment, the segment program starts listening in on a port in step 308, preferably, on a predetermined TCP port for any request packet(s) and waits for any packet(s) on the TCP port in step 310. Preferably, a packet comprises a request TCP/IP packet that is used to specify a specific action to be executed by the segment program at the remote server. So when a remote server hangs or becomes frozen or unresponsive as result of running out of memory, although, the remote server's operating system cannot launch any new processes, the remote server is not completely dead and the segment program continues to run on the remote server given that it is pinned to memory. Further, the reserve memory segment program listens on a predetermined port for any communication. Referring again to FIG. 3, on the right side of FIG. 3, a control server starts at step 324 with determining whether the remote server is out of memory in step 326. Preferably, the control server is another server that is connected to the remote server via a network connection. If the control server determines that the remote server is not out of memory in 326, then the process ends at 328. However, if the control server determines in step 326 that the remote server is out of memory, then, a decision is made to release reserve memory segment on the remote server in step 330. Preferably, a decision to release reserve memory segment can be made either manually by a system administrator or by an automatic process (for instance, an auto-recovery program running on the remote server) that checks to see whether or not the remote server is having a memory constraint and, if a memory constraint is detected, then to make a decision that a remote operation, such as releasing the reserve memory segment needs to be performed at the remote server. The remote operation of releasing reserve memory segment creates an opportunity for further actions that can be taken in order to recover the remote server. For instance, the control server may detect that the remote server is hung. The remote server is presumed to be hung or frozen if it is not responding to service requests, such as, a user cannot login, the server is not responding (server is still up and running, but refusing further requests such as attempts to start any new program due to lack of memory), the server is reported down by monitoring tools, etc. In any such situation, the system administrator makes a decision that the server is down and that a remote operation is required. However, those skilled in the art will recognize that the remote operation may be used even if the server is not hung. As a result of the decision, in step 332, a packet, preferably, a TCP/IP packet is sent on a predetermined TCP port with a request to release the reserve memory segment. Since the remote server is listening on the predetermined TCP port in step 308 and is waiting for any packets in step 310, when the control server sends the packet, the remote server is able to receive in step 312 the packet requesting release of the reserve memory segment on the TCP port. The remote server performs a request validation in step 314 to check whether the request is valid. The remote server further identifies the request type in step 316. Further, the remote server determines in step 318 if the operation or action specified in the request (namely, releasing the reserve memory segment) is allowed to the requestor, in particular, the control server. If the remote server determines that the control server is not authorized or not allowed to request the operation or action of releasing the reserve memory segment, then the remote server does not perform the operation or action requested and instead goes back to waiting for another packet on the TCP port. If, on the other hand, the remote server determines that the control server is authorized or allowed to request the release of the reserve memory segment, then the remote server performs the operation or action requested. As a result of the authentication process, the remote server releases the reserve memory segment in step 320, thus, ending the process. Preferably, the remote server releases the reserve memory segment using some sort of a system call based on the platform being used. As mentioned above, the remote segment program, which is designed for performing the release of the reserve memory segment when requested by a requester, for instance, a control server requires very little memory. Given that the segment program is pinned to memory, the segment program is still executable in a frozen remote server. The segment program listens to a TCP/IP port on the remote server. Accordingly, when the remote server becomes frozen or unresponsive, the control server is able to send a request TCP packet to the hung remote server via a network connection. The release of reserve memory segment allows, for instance, the system administrator to do a remote login via telnet or SSH and perform a corrective action such as ending a process/application that caused the memory constraint or consumption or increasing swap space size.

Turning to FIG. 4, reference numeral 400 outlines an alternate method for restoring a computing system, preferably, a remote server that is not responding due to memory constraints, in accordance with an embodiment of the invention. The method 400 for restoring a remote server starts at step 402 with a reserve memory segment program or code being pinned to a memory in the remote server in step 404. The segment program allocates a reserve memory segment in a memory of the remote server in step 406. The segment program starts listening in 410 on a predetermined TCP port for any request packets, preferably, TCP/IP packets. At a remote location, a requestor, such as a control server starts at 424 by performing a memory availability check periodically, preferably, at predetermined intervals and on the remote server. In an alternative embodiment, the pinned segment program comprises an automatic trigger to initiate the performance of a memory availability check at the remote server at predetermined intervals. The requester determines in step 428 if there is memory available. If the requestor determines in step 428 that memory is available, then the requestor goes back to step 426 of performing the periodic memory availability check. However, if the requester determines that memory is not available, that is, that there is a memory constraint, for instance, the remote server is not responding, then the requester sends in step 430 a packet on a predetermined TCP port to the remote server, preferably, a TCP/IP packet with a request to release the reserve memory segment. The remote server receives the packet with the request to release the reserve memory segment on the predetermined TCP port in step 412. The remote server performs a request validation in step 414 and identifies the request type in step 416. Further, in step 418, the remote server determines if the requestor is allowed or authorized to request the operation or action in the request received, namely of releasing the reserve memory segment. If the remote server determines that the requester is not authorized or not allowed to request the operation or action of releasing the reserve memory segment, then the remote server does not perform the operation or action requested and instead goes back to waiting for another packet on the TCP port. However, if the remote server determines that the requestor is authorized or allowed to request the operation or action of releasing the reserve memory segment, then the remote server performs the operation or action requested and in step 420 releases the reserve memory segment. The requestor checks in step 432 to see if the reserve memory segment has been released. If the requestor determines that the reserve memory segment has not been released, the requestor waits for a predetermined interval before checking to see if the reserve memory segment has been released. However, if the requester determines that the reserve memory segment has been released, the requestor initiates a corrective action necessary to restore or unfreeze the remote server, ending the process at step 434. The release of reserve memory segment allows, for instance, the system administrator to do a remote login via telnet or SSH and initiate a corrective action such as ending a process/application that caused memory consumption or increasing swap space size. Accordingly, the requester, for instance, a control server can identify an "out of memory" condition and can automatically initiate any corrective action necessary upon the release of the reserve memory segment to fix the problem with the unresponsive server. For instance, the control server can initiate the running of an auto-recovery program at the remote server to restore the remote server, if configured to do so.

In yet another embodiment, the present invention provides a computer program product for restoring a remote server that is not responding due to a memory constraint. The computer program product comprises a computer readable medium, first program instructions to allocate a reserve memory segment of a memory residing on a remote server, second program instructions to pin a reserve memory segment program to the memory residing on the remote server, third program instructions to continuously run the reserve memory segment program pinned to listen for a request packet when a memory constraint arises, fourth program instructions to release the reserve memory segment in response to the request packet that is received when the memory constraint arises on the remote server. The computer program product further comprises fifth program instructions to periodically check the memory residing on the remote server for the memory constraint and, if the memory constraint is found, to send the request packet to the remote server. Preferably, each of the first, second, third, fourth and fifth program instructions are stored on the medium. In a preferred embodiment, the third program instructions further comprise instructions to listen to a predetermined TCP/IP port for the request packet and to receive the request packet comprising a TCP/IP packet for releasing the reserve memory segment. Preferably, the fourth program instructions further comprise instructions to validate the request TCP/IP packet received and to identify the TCP/IP packet received. Further, preferably, the fourth program instructions further comprise instructions to check whether the request TCP/IP packet received corresponds to an operation that is permissible on the remote server. Preferably, the fifth program instructions further comprise instructions to perform a corrective action at the remote server upon release of the reserve memory segment.

In a preferred embodiment, the computer readable medium comprises a computer storage medium. Preferably, the computer storage medium includes semiconductor memory, magnetic disk, magnetic tape, compact disc (CD), read-only memory (ROM), and/or digital video disc (DVD). A network comprises cables, routers, switches and/or network adapter cards. Accordingly, the present invention can also be embodied in the form of computer program code, stored in a storage medium. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that store the codes or instructions for use by or in connection with the instruction execution system, apparatus, or device. Preferably, the medium can comprise an electronic, magnetic, optical, electromagnetic, infrared, or semiconductor system (or apparatus or device). More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc-read only memory (CD-ROM), compact disc-read/write (CD-R/W) and digital versatile/video disc (DVD). Further, the network can comprise cables, routers, switches and/or network adapter cards.

Figure 5:
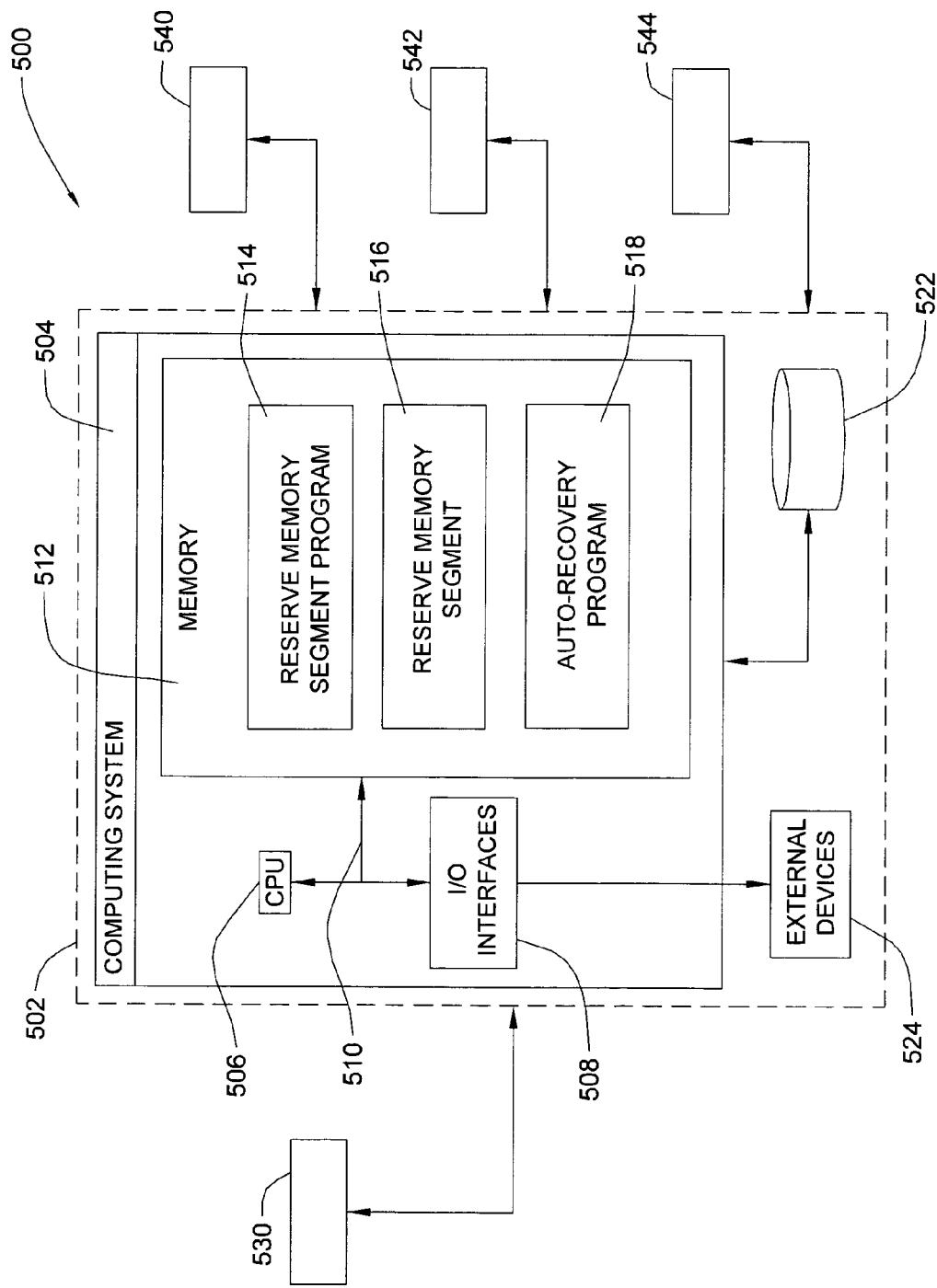
FIG. 5 is a schematic block system diagram illustrating a computer program product for testing changes to externalized or business rules, in accordance with an embodiment of the invention.

Referring to FIG. 5, reference numeral 500 is a schematic block system diagram illustrating a computer program product for restoring a remote server that is not responding due to a memory constraint. As depicted, system 500 includes a computer infrastructure 502, which is intended to represent any type of computer architecture that is maintained in a secure environment (i.e., for which access control is enforced). Computer infrastructure 502 is only illustrative of various types of computer infrastructures for implementing the invention. As shown, infrastructure 502 includes computing system 504 that typically represents a server or the like, preferably, a remote server, and further, includes computing systems 530, 540, 542 and 544. It should be understood, however, that although not shown, other hardware and software components (e.g., additional computer systems, routers, firewalls, etc.) could be included in infrastructure 502. In general, a user or a system administrator at a control server 530 interfaces with infrastructure 502 for restoring a remote server that is not responding due to a memory constraint. Further, one or more other users or system administrators (not shown in FIG. 5) can interface with infrastructure 502 to restore a remote server that is not responding due to a memory constraint. Alternatively, a system administrator 530 may be a service provider that provides a service to clients, such as clients 540, 542 and 544, where the system administrator 530 can interface with infrastructure 502 to provide a service of restoring a remote server that is not responding due to a memory constraint, preferably, with infrastructure 502 providing a secure environment. More preferably, the service provider 530 provides a service on a fee or subscription basis to clients. In general, the respective parties 530, 540, 542 and 544 could access infrastructure 502 directly, or over a network via interfaces (e.g., web browsers) loaded on computerized devices (e.g., personal computers, laptops, handheld devices, etc.). In the case of the latter, the network can be any type of network such as the Internet, a local area network (LAN), a wide area network (WAN), a virtual private network (VPN), etc. In any event, communication with infrastructure 502 could occur via a direct hardwired connection (e.g., serial port), or via an addressable connection that may utilize any combination of wire line and/or wireless transmission methods. Moreover, conventional network connectivity, such as Token Ring, Ethernet, WiFi or other conventional communications standards could be used. Still yet, connectivity could be provided by conventional TCP/IP sockets-based protocol.

Computing system or remote server 504 is shown to include a processing unit (CPU) 506, a memory 512, a bus 510, and input/output (I/O) interfaces 508. Further, computing system 504 is shown in communication with external I/O devices/resources 524 and a storage system 522. In general, processing unit 506 executes computer program codes or scripts, such as the reserve memory segment program 514, and the auto-recovery program 518, which are stored preferably in memory 512 and, alternatively, can be stored in an external storage system 522. While executing a computer program code, processing unit 506 can read and/or write data, to/from memory 512, the storage system 522, and/or I/O interfaces 508. The memory 512 further includes the reserve memory segment 516, which is released by the execution of the reserve memory segment program 514 upon authentication. Bus 510 provides a communication link between each of the components in computing system 504. External devices 524 can comprise any devices (e.g., keyboard, pointing device, display, etc.) that enable a user to interact with computing system 504 and/or any devices (e.g., network card, modem, etc.) that enable computing system 504 to communicate with one or more other computing devices. Moreover, computing system 504 is only representative of various possible computer systems that can include numerous combinations of hardware. To this extent, in other embodiments, computing system 504 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. For instance, the processing unit 506 may comprise a single processing unit, or be distributed across one or more processing units in one or more locations, e.g., on a client and server. Similarly, memory 512 on remote server 504 and/or the storage system 522 can comprise any combination of various types of data storage that reside at one or more physical locations. Further, I/O interfaces 508 can comprise any system for exchanging information with one or more external devices 524. Still further, it is understood that one or more additional components (e.g., system software, math co-processing unit, etc.—not shown in FIG. 5) can be included in computing system 504. Furthermore, if the computing system 504 comprises a handheld device or the like, it is understood that one or more external devices, for instance, a display could be contained within the computing systems, and not externally as shown for computing system 504. The storage system 522 can be any type of database system capable of providing storage for information under the present invention. To this extent, the storage system 522 could include one or more storage devices, such as a magnetic disk drive or an optical disk drive. In another embodiment, the storage system 522 includes data distributed across, for example, a local area network (LAN), wide area network (WAN) or a storage area network (SAN) (not shown). Although not shown, additional components, such as cache memory, communication systems, system software, etc., may be incorporated into computing system 504.

Accordingly, the present invention can also be embodied in the form of computer program code, for example, whether stored in a storage medium, loaded into and/or executed by a computer, or transmitted over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for restoring a server having insufficient available memory to continue to execute a first program or first process, the method comprising the steps of:
    the server pinning a second program to a first memory segment in which to execute the second program in the server such that no other program can utilize the first memory segment and the second program has sufficient memory to execute despite subsequent insufficiency of available memory in the server to execute the first program or first process, the second program controlling a second memory segment in the server for use to restore the server;
    the server executing the second program to listen for a request to release the second segment of the memory for use to restore the server; and
    subsequently, the server having insufficient available memory to continue to execute the first program or first process, and the second program receiving a request to release the second segment of the memory for use to restore the server, and in response, the second program releasing the second segment of the memory and the server using the second segment of the memory, which has been released by the second program, for operations to restore the server with sufficient available memory to execute the first program or first process.

2. The method of claim 1 wherein the operations to restore the server comprise execution of a third program at the server to automatically restore the server to provide sufficient available memory to resume execution of the first program or first process.

3. The method of claim 1, wherein the step of the server pinning the second program to the first segment of memory comprises the step of:
    the server allocating the first memory segment to the second program such that during execution of the first program or first process, the first program or first process does not compete with the second program for the first memory segment.

4. The method of claim 1, wherein the step of the server executing the second program to listen for a request to release the second memory segment comprises the step of the second program listening to a predetermined TCP/IP port for the request.

5. The method of claim 4 wherein the request is a single TCP/IP packet.

6. The method of claim 1, wherein the request to execute the second program to release the second memory segment is received over a network from another computer which has detected the inability of the server to continue to execute the first program or first process.

7. The method of claim 1 wherein the step of the server computer pinning a second program to the first memory segment is performed before the server computer has insufficient available memory to continue to execute the first program or first process, while the server computer has sufficient available memory to execute the first program or first process.

8. A computer program product for restoring a server having insufficient available memory to continue to execute a first program or first process, the computer program product comprising:
    a computer-readable, tangible storage device;
    a second program, responsive to a request, to release a second memory segment in the server for use to restore the server;
    first software instructions to pin the second program to a first memory segment in which to execute the second program in the server such that no other program can utilize the first memory segment and the second program has sufficient memory to execute despite subsequent insufficiency of available memory to execute the first program or first process; and
    second software instructions, to use the second memory segment which has been released by the second program after the server has insufficient available memory to execute the first program or first process, to restore the server with sufficient available memory to execute the first program or first process; and wherein
    the second program and the first and second software instructions are stored on the computer-readable, tangible storage device.

9. The computer program product of claim 8 wherein the second software instructions automatically restore the server to provide sufficient available memory to resume execution of the first program or first process.

10. The computer program product of claim 8, wherein the first software instructions pin the second program to the first memory segment by allocating the first memory segment to the second program such that during execution of the first program or first process, the first program or first process does not compete with the second program for the first memory segment.

11. The computer program product of claim 8, wherein the second program listens to a predetermined TCP/IP port for the request.

12. The computer program product of claim 11 wherein the request is a single TCP/IP packet.

13. The computer program product of claim 8, wherein the request is received over a network from another computer which has detected the inability of the server to continue to execute the first program or first process.

14. The computer program product of claim 8 wherein the first software instructions pin the second program to the first memory segment before the server computer has insufficient available memory to continue to execute the first program or first process, while the server computer has sufficient available memory to execute the first program or first process.

15. A server computer programmed to restore the server due to insufficient available memory to continue to execute a first program or first process, the server computer comprising:
- a CPU, a computer-readable memory and a computer readable, tangible storage device;
- a second program, responsive to a request, to release a second memory segment in the server computer for use to restore the server computer;
- first software instructions to pin the second program to a first memory segment in which to execute the second program in the server computer such that no other program can utilize the first memory segment and the second program has sufficient memory to execute despite subsequent insufficiency of available memory to execute the first program or first process; and
- second software instructions, to use the second memory segment which has been released by the second program after the server computer has insufficient available memory to execute the first program or first process, to restore the server computer with sufficient available memory to execute the first program or first process; and wherein the second program and the first and second software instructions are stored on the computer-readable, tangible storage device for execution by the CPU via the computer-readable memory.

16. The server computer of claim 15 wherein the second software instructions automatically restore the server computer to provide sufficient available memory to resume execution of the first program or first process.

17. The server computer of claim 15, wherein the first software instructions pin the second program to the first memory segment by allocating the first memory segment to the second program such that during execution of the first program or first process, the first program or first process does not compete with the second program for the first memory segment.

18. The server computer of claim 15, wherein the second program listens to a predetermined TCP/IP port for the request.

19. The server computer of claim 15 wherein the request is received over a network from another computer which has detected the inability of the server computer to continue to execute the first program or first process.

20. The server computer of claim 15 wherein the first software instructions pin the second program to the first memory segment before the server computer has insufficient available memory to continue to execute the first program or first process, while the server computer has sufficient available memory to execute the first program or first process.

* * * * *